US009946667B2

(12) United States Patent
Lahti et al.

(10) Patent No.: US 9,946,667 B2
(45) Date of Patent: Apr. 17, 2018

(54) MICROCONTROLLER WITH CONFIGURABLE LOGIC ARRAY

(75) Inventors: Gregg Lahti, Gilbert, AZ (US); Steven Dawson, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 1483 days.

(21) Appl. No.: 12/560,688

(22) Filed: Sep. 16, 2009

(65) Prior Publication Data
US 2010/0122007 A1 May 13, 2010

Related U.S. Application Data

(60) Provisional application No. 61/113,753, filed on Nov. 12, 2008.

(51) Int. Cl.
*G06F 13/24* (2006.01)

(52) U.S. Cl.
CPC ................... *G06F 13/24* (2013.01)

(58) Field of Classification Search
CPC .......................................... G06F 13/24
USPC ................................ 710/260, 262
See application file for complete search history.

(56) References Cited

U.S. PATENT DOCUMENTS

| | | | |
|---|---|---|---|
| 3,419,852 A * | 12/1968 | Marx et al. ..................... 710/48 |
| 5,142,625 A * | 8/1992 | Nakai .................. G06F 15/7867 710/260 |
| 5,386,155 A * | 1/1995 | Steele et al. ..................... 326/37 |
| 5,594,367 A * | 1/1997 | Trimberger et al. ........... 326/41 |
| 5,768,598 A * | 6/1998 | Marisetty et al. ............ 710/260 |
| 5,923,897 A * | 7/1999 | Lipe et al. ......................... 710/5 |
| 6,038,661 A * | 3/2000 | Yoshioka et al. ............. 712/244 |
| 6,066,961 A | 5/2000 | Lee et al. ......................... 326/39 |
| 6,898,101 B1 * | 5/2005 | Mann .............................. 365/51 |
| 6,980,024 B1 * | 12/2005 | May et al. ...................... 326/39 |
| 7,536,669 B1 * | 5/2009 | Anderson ...................... 716/138 |
| 7,653,762 B1 * | 1/2010 | Neuendorffer et al. ......... 710/18 |
| 8,135,884 B1 * | 3/2012 | Sullam .................... G06F 13/24 710/266 |
| 8,151,031 B2 * | 4/2012 | Biscondi et al. ................. 711/5 |
| 8,321,614 B2 * | 11/2012 | Wolfe ........................... 710/267 |
| 2001/0011345 A1 * | 8/2001 | Shigeki et al. ............... 712/226 |
| 2002/0007467 A1 * | 1/2002 | Ma et al. ....................... 713/501 |
| 2004/0017724 A1 * | 1/2004 | Kubota et al. ................. 365/222 |

(Continued)

FOREIGN PATENT DOCUMENTS

| | | | |
|---|---|---|---|
| KR | 2004006762 A * | 1/2004 | |
| WO | 97/07466 | 2/1997 | ............. G06F 15/78 |

OTHER PUBLICATIONS

International PCT Search Report, PCT/US2009/063990, 3 pages, dated May 7, 2010.

(Continued)

*Primary Examiner* — Henry Tsai
*Assistant Examiner* — Christopher A Daley
(74) *Attorney, Agent, or Firm* — Slayden Grubert Beard PLLC

(57) ABSTRACT

A microcontroller may have a central processing unit (CPU); a programmable logic device receiving input signals and having input/outputs coupled with external pins, and an interrupt control unit receiving at least one of the internal input signals or being coupled with at least one of the input/outputs and generating an interrupt signal fed to the CPU.

31 Claims, 8 Drawing Sheets

(56) References Cited

U.S. PATENT DOCUMENTS

| | | | |
|---|---|---|---|
| 2004/0130944 A1* | 7/2004 | Krause | G11C 16/102 365/185.01 |
| 2004/0246780 A1* | 12/2004 | Kawahara et al. | 365/185.28 |
| 2004/0250147 A1* | 12/2004 | Chang | 713/323 |
| 2005/0010707 A1* | 1/2005 | Francis | 710/260 |
| 2005/0102573 A1* | 5/2005 | Sun et al. | 714/30 |
| 2005/0138257 A1* | 6/2005 | Burdass et al. | 710/262 |
| 2006/0186917 A1* | 8/2006 | May | G06F 15/7867 326/39 |
| 2008/0212590 A1* | 9/2008 | Stanley-Jones | 370/395.5 |
| 2008/0263334 A1* | 10/2008 | Synder | H03K 19/177 712/221 |
| 2009/0059955 A1* | 3/2009 | Georgiou et al. | 370/466 |
| 2010/0088446 A1* | 4/2010 | Greb et al. | 710/266 |
| 2013/0046915 A1* | 2/2013 | Kothari et al. | 710/317 |

OTHER PUBLICATIONS

Taiwan Office Action, Application No. 098138286, 19 pages, dated Aug. 6, 2014.

Korean Office Action, Application No. 20117004829, 11 pages, dated Jun. 2, 2016.

Korean Office Action, Application No. 2011-7004829, 6 pages, dated Mar. 28, 2016.

European Office Action, Application No. 09793633.0, 5 pages, dated Aug. 1, 2016.

Chinese Office Action, Application No. 200980145107.2, 5 pages, dated Feb. 18, 2014.

Chinese Office Action, Application No. 200980145107.2, 11 pages, dated Aug. 21, 2014.

Korean Office Action, Application No. 1020117004829, 8 pages, dated May 20, 2015.

European Office Action, Application No. 09793633.0, 4 pages, dated Jan. 13, 2014.

Chinese Office Action, Application No. 200980145107.2, 6 pages, dated May 28, 2013.

Korean Office Action, Application No. 20117004829, 7 pages, dated Apr. 28, 2017.

* cited by examiner

MICROCONTROLLER WITH CONFIGURABLE LOGIC ARRAY

CROSS-REFERENCE TO RELATED APPLICATIONS

This application claims the benefit of U.S. Provisional Application No. 61/113,753 filed on Nov. 12, 2008, entitled "MICROCONTROLLER WITH CONFIGURABLE LOGIC ARRAY", which is incorporated herein in its entirety.

TECHNICAL FIELD

The technical field of the present application relates to a microcontrollers.

BACKGROUND

Microcontrollers usually comprise a microprocessor, memory, and a plurality of peripheral devices to form a system on a chip that can be applied in a plurality of applications. Generally, very little if no additional hardware is necessary to design a printed circuit board used for controlling a system in which the microcontroller is integrated. However, often a single or multiple inverter, XOR gate or something similar is necessary to condition signals between devices. These are often costly and require significant board space.

For more flexibility U.S. Pat. No. 6,066,961 discloses to couple a microcontroller with a programmable logic device. This solution, however, still requires significant board space. U.S. Pat. No. 6,898,101 discloses a microcontroller including an integrated programmable logic device. The different embodiments disclosed in these reference however, keep the programmable logic device and its input and outputs still separate from the microcontrollers. In case the necessary logic in a system design requires a combined function of programmable logic device and microcontroller, these embodiments still face the same problems stated above. Hence, there exists a need for an improved combination of a microcontroller and a programmable logic device integrated in a single chip.

SUMMARY

In one embodiment, a microcontroller may comprise a central processing unit (CPU); a programmable logic device receiving input signals and having input/outputs coupled with external pins; an interrupt control unit receiving at least one of the internal input signals or being coupled with at least one of the input/outputs and generating an interrupt signal fed to the CPU.

According to a further embodiment, the interrupt control unit may receive at least one signal select from the group consisting of: the input signals and input/output signals from the input/outputs. According to a further embodiment, the interrupt control unit may be operable to mask the input signals or input/output signals. According to a further embodiment, the interrupt control unit may be operable to determine a polarity of the input signals or input/output signals which generates the interrupt signal. According to a further embodiment, the interrupt control unit can be operable to determine whether a rising or falling edge of the input signals or input/output signals which generates the interrupt signal. According to a further embodiment, the programmable logic device may comprise a programmable AND array and a plurality of input/output cells. According to a further embodiment, the microcontroller may further comprise a clock select unit generating a clock signal fed to the programmable logic device. According to a further embodiment, the clock select unit can be operable to select between a plurality of clock signals generated by at least one peripheral timer unit. According to a further embodiment, the clock select unit can be operable to select between an internal and an external clock signals. According to a further embodiment, the programmable logic device may be re-programmable through a plurality of special function registers. According to a further embodiment, the microcontroller may comprise external input pads receiving the input signals. According to a further embodiment, the microcontroller may comprise an input register coupled with the programmable logic device to provide the input signals. According to a further embodiment, the microcontroller may comprise at least one multiplexer controlled to select at least one input signal from an external input pad or an internal register.

According to another embodiment, a microcontroller may comprise a central processing unit (CPU); a programmable logic device having a matrix receiving input signals, wherein the matrix comprises a first plurality of logic cells coupled with external input/outputs pins and a second plurality of logic cells coupled with an interrupt input of the CPU.

According to a further embodiment, the programmable logic device may comprise a programmable AND array and a plurality of input/output cells. According to a further embodiment, the microcontroller may further comprise a clock select unit generating a clock signal fed to the programmable logic device. According to a further embodiment, the clock select unit may be operable to select between a plurality of clock signals generated by at least one peripheral timer unit. According to a further embodiment, the clock select unit can be operable to select between an internal and an external clock signals. According to a further embodiment, the programmable logic device may be re-programmable through a plurality of special function registers. According to a further embodiment, the microcontroller may comprise external input pads receiving the input signals. According to a further embodiment, the microcontroller may comprise an input register coupled with the programmable logic device to provide the input signals. According to a further embodiment, the microcontroller may comprise at least one multiplexer controlled to select at least one input signal from an external input pad or an internal register.

According to yet another embodiment, a method of operating a microcontroller comprising a central processing unit (CPU), a programmable logic device receiving input signals and having input/outputs coupled with external pins, an interrupt control unit receiving at least one of the input signals or at least one signal from the input/outputs and generating an interrupt signal fed to the CPU; may comprise the steps of: programming the programmable logic device via the CPU; and configuring the interrupt control unit to generate an interrupt signal upon dynamic or static signal conditions of at least one signal selected from the group consisting of the input signals and signals from the input/outputs of the programmable logic device.

According to a further embodiment, the method may further comprise the step of receiving a plurality of signals at the interrupt control unit selected from the group consisting of: the input signals or signals from the input/outputs. According to a further embodiment, the step of configuring may comprise masking the signals. According to a further embodiment, the step of configuring may comprise determining a polarity of the signals. According to a further embodiment, the step of configuring may comprise determining a rising or falling edge of the signals which generate the interrupt signal. According to a further embodiment, the method may further comprise the step of selecting a clock signal and feeding the selected clock signal to the programmable logic device. According to a further embodiment, the method may further comprise the step of selecting between an internal and an external clock signals and feeding the selected clock signal to the programmable logic device. According to a further embodiment, the programmable logic device may be re-programmable through a plurality of special function registers.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Figure 1:
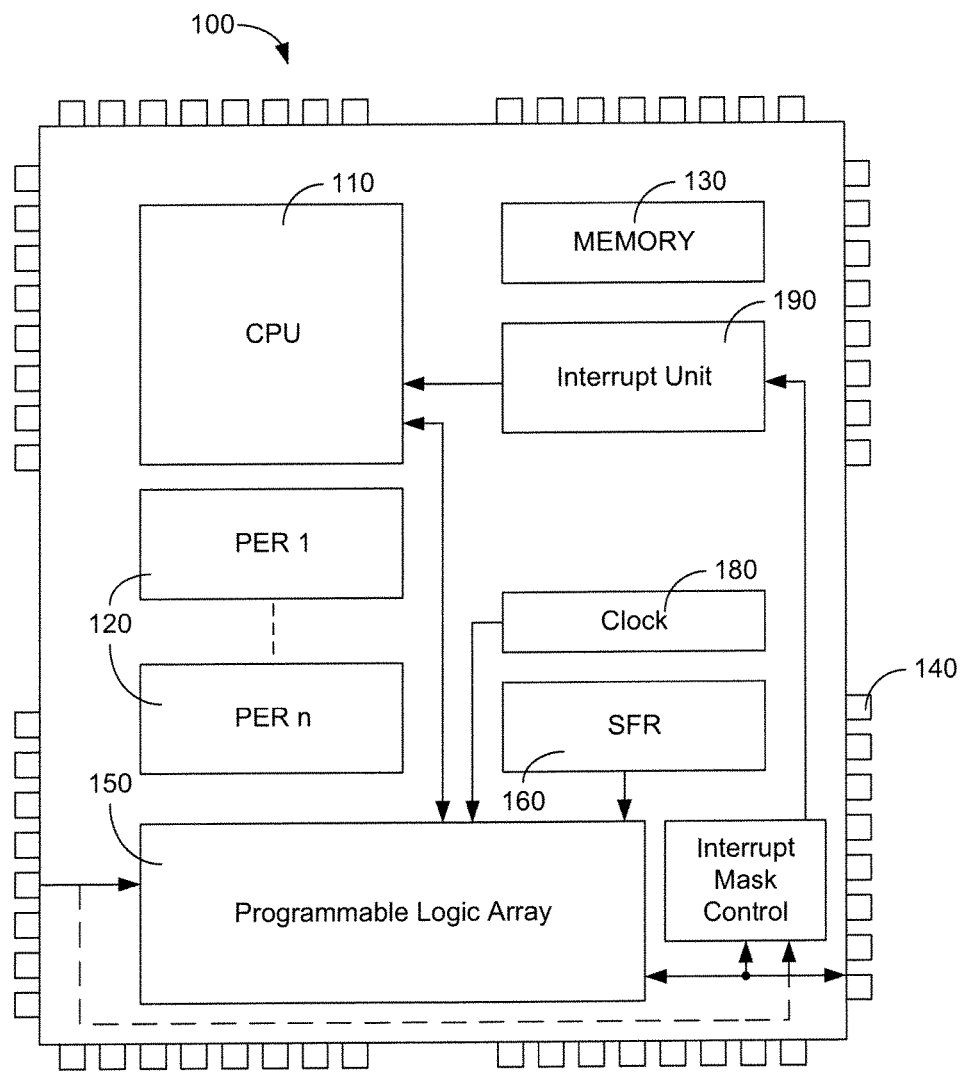
FIG. 1 is a block diagram showing a microcontroller according to an embodiment.

FIG. 1 shows a block diagram of a microcontroller according to an embodiment. An integrated chip is embedded in a housing having 100 having a plurality of external pins 140. As typical for microcontrollers, the integrated chip comprises a central processing unit 110, a plurality of peripheral devices 120 and memory 130. Furthermore, according to an embodiment, the microcontroller comprises a programmable logic device (PLD) 150 coupled with external input pins and external input/output pins. The PLD 150 is furthermore coupled with the CPU, for example, via an internal system or peripheral bus. The programmable logic device may furthermore be programmable via special function registers contained in special function register block 160. A variety of clock signals may be provided to PLD 150 via clock signal unit 180. An interrupt mask control unit 170 is provided as a connection link between CPU 110 and PLD 150. To this end, interrupt mask control unit 170 may be coupled with selected ones of external input and/or input/output signals or with all of these signals depending on the implementation and design of the microcontroller with integrated PLD. The interrupt mask control unit may generate at least one interrupt signal which is either directly fed to CPU 110 or to an interrupt controller 190.

PLD 150 may be implemented such that it comprises the functionality of a programmable array logic (PAL) device. A PAL device provides means of creating combinational logic using an array of AND gates, inverters and Flip-Flops. Such functionality may be implemented using a limited number of pins. Additional features usually not implemented in a PAL can be added. For example, according to an embodiment, the programmable logic device may be implemented such that it is re-programmable. Furthermore, according to an embodiment as will be explained later, the programmable logic device is tied into the microcontroller system architecture using a dedicated interrupt mask control unit 170.

Figure 2:
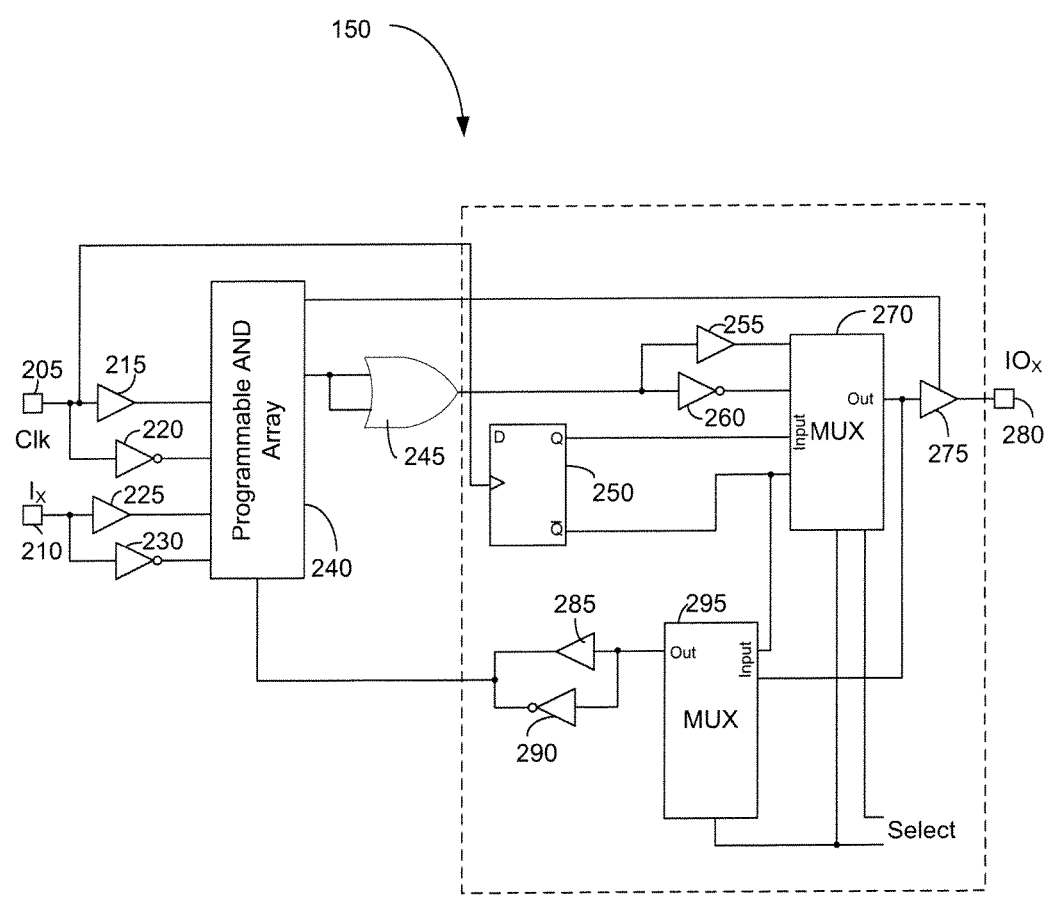
FIG. 2 shows an embodiment of a programmable AND array and macro cell.

According to an embodiment, as shown in FIG. 2, a programmable logic device 150 can consist of a programmable AND Array in combination with a I/O macrocell that allows combinatorial or sequential output to programmable external pins. The I/O macrocell can be designed to allow combinatorial or sequential feedback into the AND array to enable a primitive state machine function operation. The programmable AND array can be built in a variety of ways.

FIG. 2 shows one exemplary embodiment of a combination of programmable AND array and a single I/O macrocell. An external signal Ix can be fed into the programmable AND Array 240 through external pin 210. To allow processing of inverted signals, pin 210 is coupled with programmable AND array 240 through driver 225 and inverter 230, respectively. An external clock signal CLK can be fed to programmable AND array 240 in a similar way using driver 215 and inverter 220. In another embodiment, an internal clock signal can be provided instead of external clock signal CLK. In yet another embodiment, as will be explained in more detail below, a variety of internal and external clock signals may be selectable through a respective multiplexer circuit. Programmable AND array 240 may generate an enable output signal fed to output driver 275. A output signal may be fed logic gate 245 for combination with other programmable AND array output signals as will be explained below in more detail. The output signal of logic gate 245 is then split into positive and inverted signals by driver 255 and inverter 260 in the I/O macrocell. The I/O macrocell also receives the selected clock signal which may be coupled with the clock input of Flip-Flop 250 which also receives the driven output signal from programmable AND array 240. Positive and inverted output signals from Flip-Flop 250 are fed along with output signals of driver 255 and inverter 265 to inputs of multiplexer 270. Multiplexer 270 generates an output signal that is fed through controllable driver 270 to external input/output pin $IO_x$ 280. The inverted output signal of Flip-Flop 240 can be furthermore fed to an input of multiplexer 295 which also receives a potential input signal from pin 280. Respective select signals are provided for multiplexers 270 and 295. The output of multiplexer 295 provides for a feedback signal and which is split into a positive and inverted feedback signal through driver 285 and inverter 290 and fed back to programmable AND array 240.

The configuration of the AND array 240 and the multiplexers select signals in the I/O macrocell can be register based. To this end, special function register bank 160 may provide dedicated control registers. The configuration information for the module can be stored in many ways. For example, according to one embodiment, the information can be pre-loaded from a Flash memory infoblock, a user Flash area, or programmed directly through user software code. Methods of configuration at power-up could be auto-loaded though a DMA channel, module bus mastering, or user-programmed through software. For example, the Verilog language could be used as a baseline for the state equations because this language is well known in the field of circuit design. This language could be easily integrated into a development software suite for a microcontroller to allow for additional hardware design of the logic array.

Figure 3:
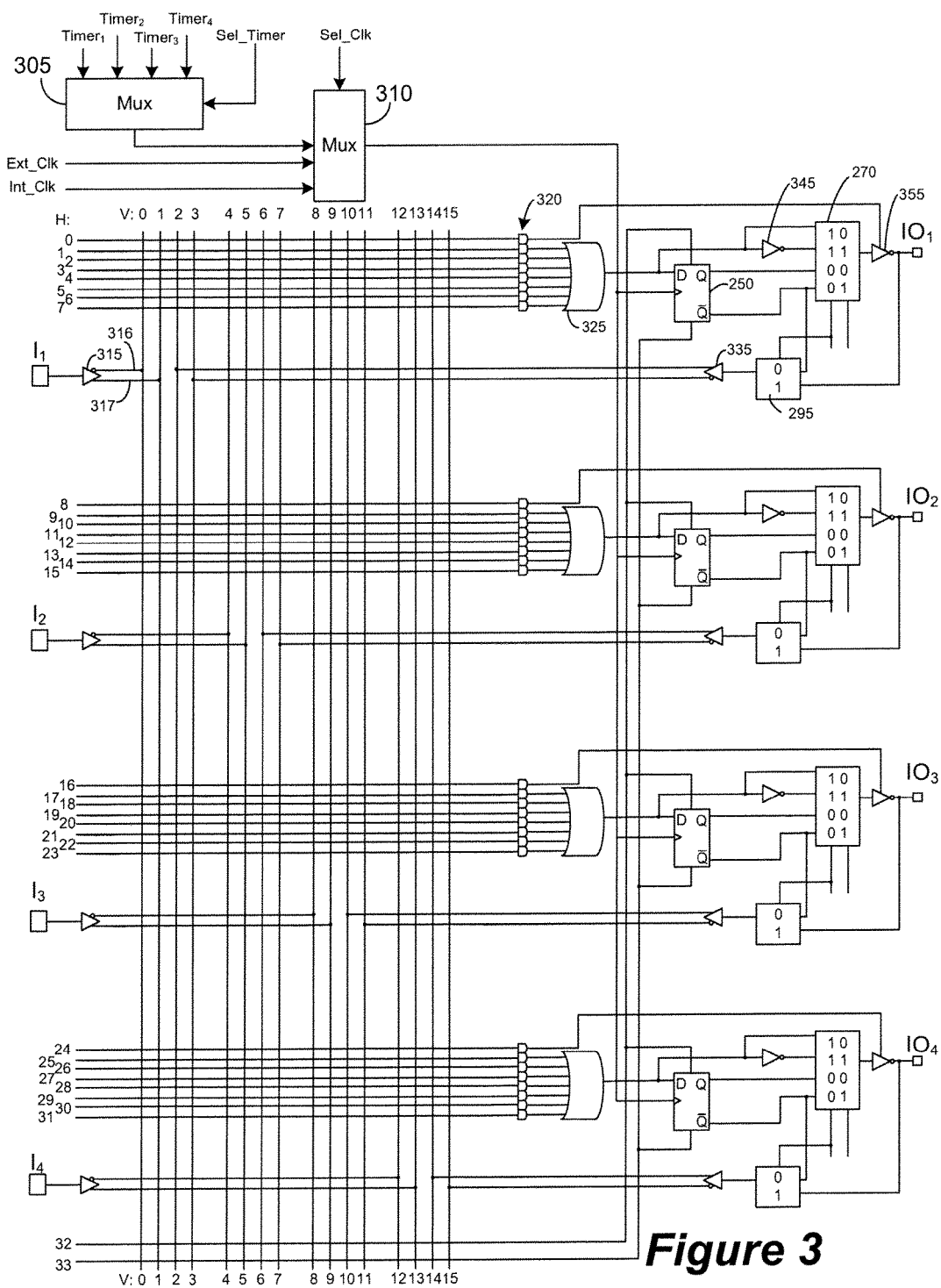
FIG. 3 shows an embodiment of a programmable logic device with four inputs and four inputs/outputs as well as selectable clock sources.

FIG. 3 shows the application of the principal structure shown in FIG. 2 suitable for a microcontroller. According to this implementation, four external input pins $I_1$-$I_4$ and four external input/output pins $IO_1$-$IO_4$ are provided. The programmable AND array is indicated by crossings of horizontal lines $H_0$-$H_{33}$ with vertical lines $V_0$-$V_{15}$ and its programmability will be explained in more detail below. Horizontal lines are grouped into groups with 8 lines. These 8 horizontal lines are fed to one I/O macrocell through eight AND gates 320 and one OR gate 325. Each AND gate 320 receives all outputs from each horizontal group, for example, $H_0$-$H_7$, respectively as will be explained in more detail with respect to FIG. 6. The OR gate 325 may receive the outputs of all AND gates 320 (see FIG. 6) or as shown in FIG. 3 the outputs from groups $H_1$-$H_7$. According to one embodiment, the first horizontal output line is used as an enable line for output driver 355. In the embodiment shown in FIG. 3, the I/O macrocell comprises only a single inverter 345 instead of a driver/inverter pair as shown in FIG. 2. Also, the output of positive and inverted signals is provided by a balanced drivers 315 and 335, respectively.

FIG. 3 also shows in the upper right corner a possible clock selection implementation. A first multiplexer 305 receives four different clock signals $Timer_1$, $Timer_2$, $Timer_3$, and $Timer_4$ which can be generated by respective peripheral timer devices. A timer select signal sel_tim is used to control multiplexer 305. The output signal of multiplexer 305 is fed to one input of a second multiplexer 310 which also receives an internal system clock int_clk and is connected to an external pin receiving an external clock signal ext_clk. Multiplexer 310 is controlled by control signal sel_clk which determines which clock signal is used by the programmable logic device. The clock signal is fed to all Flip-Flops 250 of each of the four I/O macrocells. These Flip-Flops also have set and reset inputs which are controlled by the AND matrix through horizontal output lines $H_{32}$ and $H_{33}$.

Figure 4:
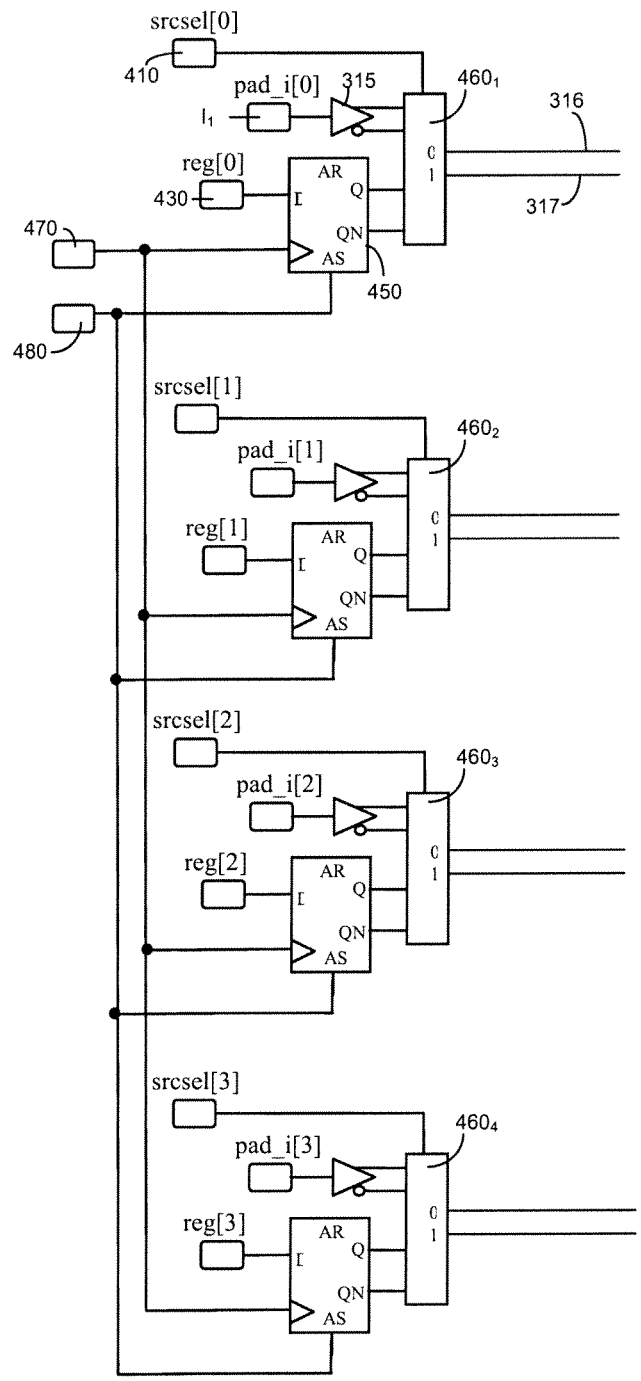
FIG. 4 shows another embodiment of the input side of a programmable logic device as shown in FIG. 3.

FIG. 4 shows an alternative embodiment of the input structure to the matrix shown in FIG. 3. Thus, for a better overview only the input lines 316 and 317 from FIG. 3 are shown in FIG. 4. For each input group a multiplexer $460_{1-4}$ is provided which selects either the signals provided by input pad $I_{1-4}$ or the output signals provided by Flip-Flop 450. Flip-Flop 450 receives an input signal from a register reg[0 . . . 3] 430 and may be clock driven through clock signal 470 and reset through reset signal 480. A select signal 410 is provided, for example by a select register srcsel[0 . . . 3]. Thus, through the respective bits of select register srcsel[0 . . . 3] each multiplexer $460_{1-4}$ is controlled to either select the input pad $I_{1-4}$ or the register reg[0 . . . 3]. According to various embodiments, a programmable device may receive input signals from only external input pads, from only internal registers or input signals selectable by a multiplexer from either source.

Figure 5:
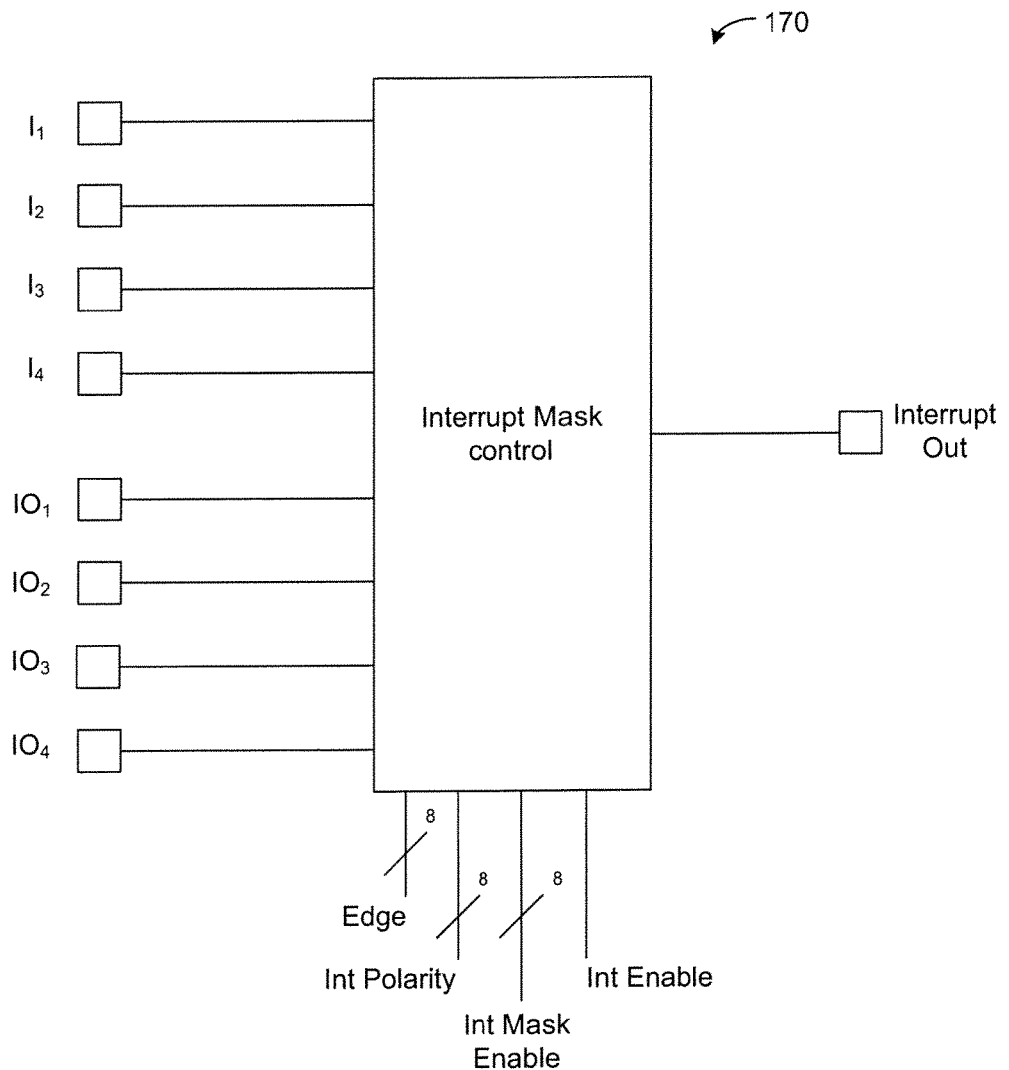
FIG. 5 shows a block diagram of one embodiment of an interrupt control unit as a link between programmable logic device and microcontroller.

The programmable logic device is embedded into the microcontroller through a specifically designed interrupt control logic. To this end, a specific interrupt mask control unit 170 may provide for programmable interrupt generation as shown in FIG. 5. According to one embodiment using a programmable logic device as shown in FIG. 3 or 4, all four input signals $I_1$-$I_4$ and all four input/output signals $IO_1$-$IO_4$ are fed to eight inputs of interrupt mask control unit 170. The interrupt mask control unit can be designed to be programmable with respect to the generation of an interrupt out signal. For example, a first control signal EDGE may define whether an interrupt for a rising or falling edge on each input will be generated. According to another embodiment, the polarity that triggers an interrupt may be programmable for each input via control signal Int_Polarity. Signal Int_Mask can be used to selectively mask out single input signals. Moreover, a general enable signal Int-Enable may be used to activate the interrupt Mask control unit 170. Any of these options may be combined and other control options may be included. For example, interrupt mask control unit may generate a plurality of interrupt output signals having different priorities.

Figure 6:
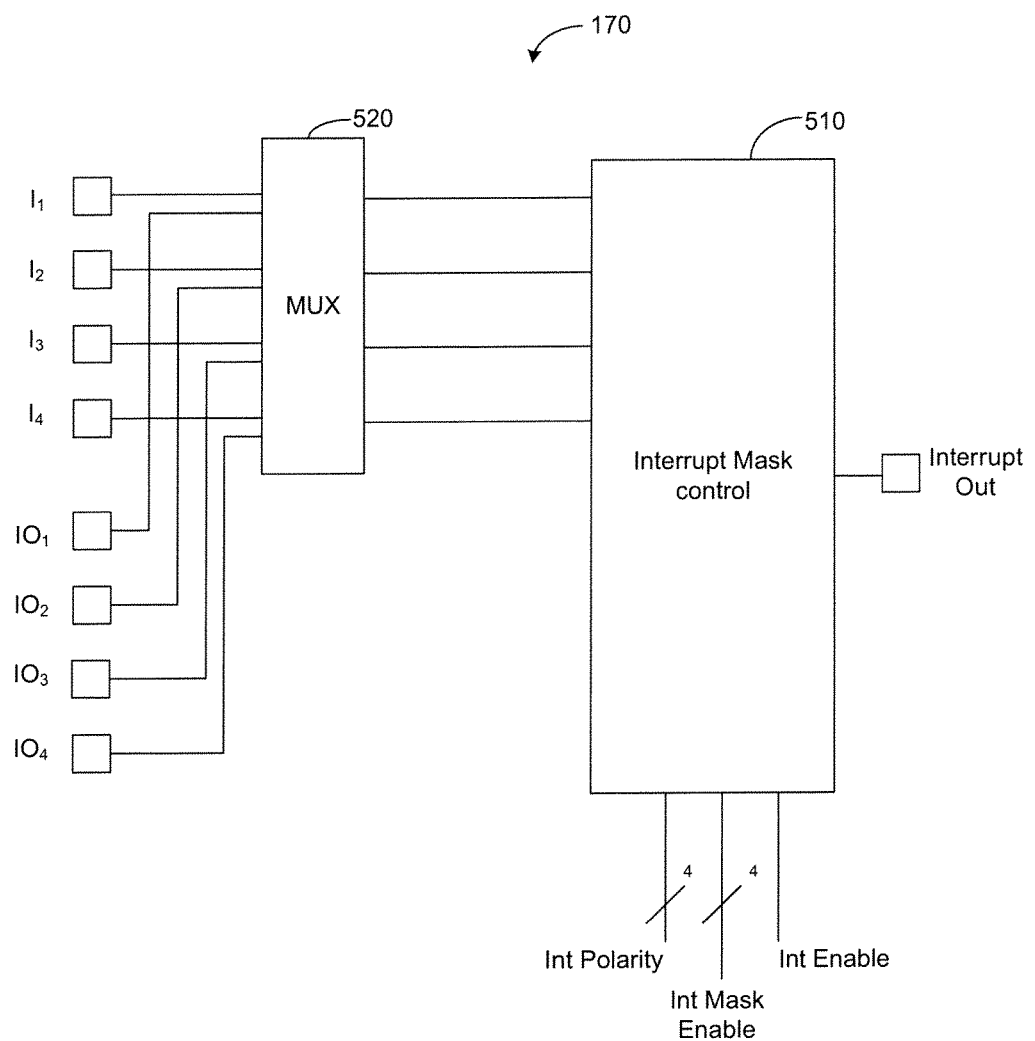
FIG. 6 shows a block diagram of another embodiment of an interrupt control unit as a link between programmable logic device and microcontroller.

FIG. 6 shows yet another embodiment in which a more limited number of input signals is used in a interrupt mask control unit. In this embodiment, a multiplexer 520 is used to select four out of eight input signals and feed them to interrupt mask control unit 510. This embodiment requires less control signals as only four input signals are present. According to another embodiment only a selected number of input and/or output signals of the programmable logic device is used to generate an interrupt. In such an embodiment, the multiplexer 520 con be omitted.

Figure 7:
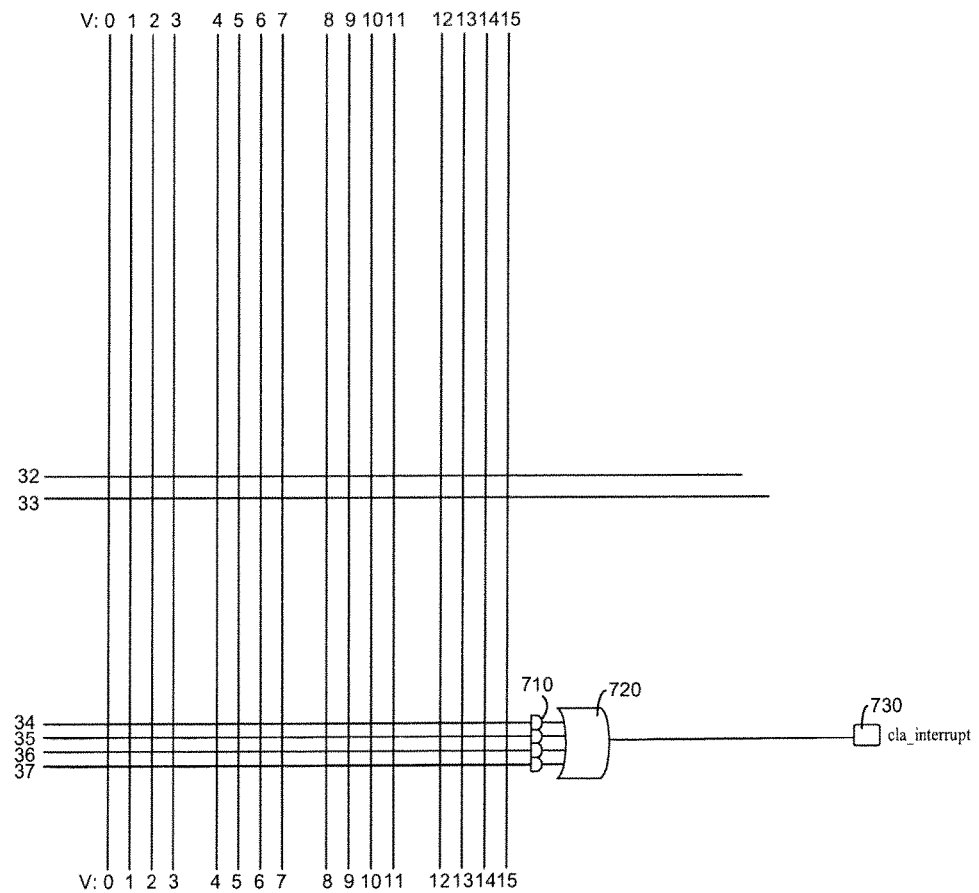
FIG. 7 shows another embodiment of a programmable logic device with interrupt lines added to the matrix.

FIG. 7 shows yet another embodiment in which the interrupt signals are generated directly from the matrix. To this end, an interrupt signal 730 can be generated through respective matrix cells similar like the cells used for the programmable logic device. Thus, according to an embodiment, four input lines 34-37 are added to form a respective matrix with the vertical lines $V_{0-15}$. Each group is then connected to a respective AND gate 710 and a respective OR gate 720 combines the groups to interrupt output signal 730 similar as for each input group shown in FIG. 3. According to various embodiments, the interrupt signals may be selected from any combination of the disclosed interrupt sources. Thus, a device may have a combination of matrix generated interrupts or interrupt signals generated from the input signals and/or input/output signals.

Figure 8:
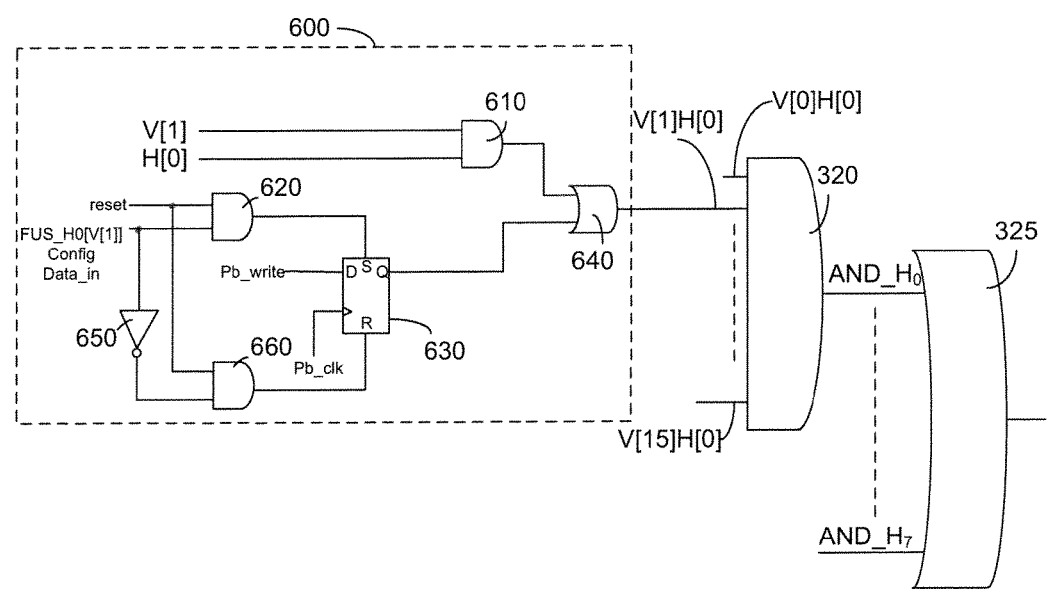
FIG. 8 shows an example of a connection point in the matrix of the programmable AND array as shown in FIGS. 2 and 3.

FIG. 8 shows a possible implementation for a programmable configuration cell represented by a crossing of a horizontal and vertical line as shown in FIGS. 3, 4, and 7. Other implementations can be used according to different embodiments. Each connection point in the horizontal/vertical matrix can be, for example, implemented by a cell as shown by the dotted box 600 in FIG. 8. For example, for the matrix point V[1]/H[0], both lines are fed to an AND gate 610 whose output is coupled with the first input of an OR gate 640. A flip-flop 630 may be used to set an initial configuration signal that may be defined, for example, by a fuse signal FUS_H0[V[1]]] generated by a respective fuse. This fuse signal defines the state of flip-flop 630 after a reset has been applied through AND gates 620 and 660 which control the Set and Reset inputs of flip-flop 630. To this end, the fuse signal is fed to a first input of AND gate 620 and inverted by inverter 650 and fed to a first input of AND gate 660. The second inputs of AND gates 620 and 660 receive the reset signal. During operation of the device, i.e. after reset of the device, a user can overwrite the state of flip-flop 630 as defined by the fuse signal using the Pb_write and Pb_clk signals. The flip-flop 630 is the configuration flop whose state defines if the V[1] and H[0] intersection should be connected or not. Flip-Flop 630 is clocked by the clock signal Pb_clk. The output of Flip-Flop 630 is coupled with the second input of OR gate 640. The output of this matrix connection cell 600 is fed to one of 16 inputs of AND gate 320. The output of AND gate 320 is then fed to one of eight inputs of OR gate 325 as also shown in FIG. 3.

According to another embodiment, the logic 620, 630, 650, and 660 could be entirely replaced by a fuse-based PAL logic. The fuse signal FUS_H0[V[1]]] alone would then determine the respective matrix point.

The various embodiments can be configured to provide for a very flexible additional on board hardware to design systems with different additional logic requirements. For example, the programmable logic device can be programmed to form a simple state machine that can be tightly integrated into the microcontroller via the flexible interrupt control unit. According to one embodiment, such a state machine can be programmed to detect a serial bit sequence and generate an interrupt upon detection of such a sequence. The length of such a detectable bit sequence depends only on the complexity of the programmable logic device. The re-programmability of the system allows a dynamic change of its configuration. Thus, a very flexible system can be created that can be re-programmed on the fly.

The advantages of the various embodiments can be seen as user-configurability at run-time. A user can change the configuration at any point of operation by re-programming the respective configuration registers. The clock source is programmable from various internal microcontroller sources or an external pin. The operation of the circuit could be as fast as the microcontroller peripheral bus clock. A companion piece of software, for example written in JAVA for usability across platforms, may be provided to allow a user to create logic equations for the logic functions and make it easy to implement the actual custom solution. According to an embodiment, a Verilog-like language may be used as the description language to the state equations. Such an application could effectively compile the logic equations into a fuse map which is translated into a hexadecimal data file which a user can program into the user flash and write into the configuration registers accordingly. Such a method would allow flexible configurations that a user can program at their convenience. The various embodiments can free the microprocessor of a microcontroller for other tasks as the certain logic functions can be performed by the programmable logic.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A microcontroller comprising:
   a programmable logic device comprising input connections coupled with a programmable AND array which is coupled with a plurality of macro cells wherein each macro cell is coupled with an input/output connection, wherein the programmable logic device is programmable to perform at least one logic function on at least one internal signal and at least one signal received from at least one of the input connections to generate a logic output signal according to the at least one logic function, wherein each input connection and each input/output connection is connected with a respective external pin of the microcontroller;
   a central processing unit (CPU) and operable to program said programmable logic device via special function registers;
   an interrupt control unit directly coupled with at least one of said inputs or input/output connections of said programmable logic device to receive at least one of said input signals or at least one of an input/output signal fed to said input/output connections and generating an interrupt signal fed to said CPU.

2. The microcontroller according to claim 1, wherein the interrupt control unit receives at least one signal select from the group consisting: of said input signals and input/output signals from said input/outputs.

3. The microcontroller according to claim 2, wherein said interrupt control unit is operable to mask said input signals or input/output signals.

4. The microcontroller according to claim 2, wherein said interrupt control unit is operable to determine a polarity of said input signals or input/output signals which generates said interrupt signal.

5. The microcontroller according to claim 2, wherein said interrupt control unit is operable to determine whether a rising or falling edge of said input signals or input/output signals which generates said interrupt signal.

6. The microcontroller according to claim 1, wherein programmable logic device comprises a programmable AND array and a plurality of input/output cells.

7. The microcontroller according to claim 1, further comprising a clock select unit generating a clock signal fed to said programmable logic device.

8. The microcontroller according to claim 1, wherein said clock select unit is operable to select between a plurality of clock signals generated by at least one peripheral timer unit.

9. The microcontroller according to claim 1, wherein said clock select unit is operable to select between an internal and an external clock signals.

10. The microcontroller according to claim 1, wherein said programmable logic device is re-programmable through a plurality of special function registers.

11. The microcontroller according to claim 1, comprising external input pads receiving said input signals.

12. The microcontroller according to claim 1, comprising an input register coupled with said programmable logic device to provide said input signals.

13. The microcontroller according to claim 1, comprising at least one multiplexer controlled to select at least one input signal from an external input pad or an internal register.

14. A microcontroller comprising:
    a central processing unit (CPU);
    a programmable logic device having a matrix receiving a plurality of input signals from associated external pins of the microcontroller, wherein said matrix comprises a first plurality of programmable logic cells coupled with external input/outputs pins of said microcontroller and at least one second programmable logic cell coupled with said matrix and with an interrupt input of said CPU, wherein the programmable logic device is programmable to perform at least one logic function by at least one of said first plurality of programmable logic cells on at least one of the input signals received at an associated external pin and generate a corresponding logic output signal at one of the input/output pins, and wherein the CPU is operable to program said programmable logic device via special function registers.

15. The microcontroller according to claim 14, wherein programmable logic device comprises a programmable AND array and a plurality of input/output cells.

16. The microcontroller according to claim 14, further comprising a clock select unit generating a clock signal fed to said programmable logic device.

17. The microcontroller according to claim 14, wherein said clock select unit is operable to select between a plurality of clock signals generated by at least one peripheral timer unit.

18. The microcontroller according to claim 14, wherein said dock select unit is operable to select between an internal and an external clock signals.

19. The microcontroller according to claim 14, wherein said programmable logic device is re-programmable through a plurality of special function registers.

20. The microcontroller according to claim 14, comprising external input pads receiving said input signals.

21. The microcontroller according to claim 14, comprising an input register coupled with said programmable logic device to provide said input signals.

22. The microcontroller according to claim 14, comprising at least one multiplexer controlled to select at least one input signal from an external input pad or an internal register.

23. A method of operating a microcontroller comprising a central processing unit (CPU), a programmable logic device comprising a programmable AND array receiving input signals from associated external pins and being coupled with a plurality of macro cells wherein each macro cell is coupled with input/output connections wherein each input/output connection is connected with a respective external pin, an interrupt control unit directly receiving at least one of said input signals or at least one signal from said input/output connections and generating an interrupt signal fed to said CPU; the method comprising the steps of:
  programming said programmable logic device via said CPU;
  performing a logic function according to said programming on at least one input signal received at one of the external pins and generate an output signal according to said logic function at one of said input/output connections;
  configuring said interrupt control unit to generate an interrupt signal upon dynamic or static signal conditions of at least one signal selected from the group consisting of said input signals and signals from said input/output connections of said programmable logic device.

24. The method according to claim 23, further comprising the step of receiving a plurality of signals at said interrupt control unit selected from the group consisting of: said input signals or signals from said input/outputs.

25. The method according to claim 24, wherein said step of configuring comprises masking said signals.

26. The method according to claim 24, wherein said step of configuring comprises determining a polarity of said signals.

27. The method according to claim 24, wherein said step of configuring comprises determining a rising or falling edge of said signals which generate said interrupt signal.

28. The method according to claim 23, further comprising the step of selecting a clock signal and feeding the selected dock signal to said programmable logic device.

29. The method according to claim 23, further comprising the step of selecting between an internal and an external dock signals and feeding the selected clock signal to said programmable logic device.

30. The method according to claim 23, wherein said programmable logic device is re-programmable through a plurality of special function registers.

31. An microcontroller device having a housing with external pins, further comprising:
  a programmable logic device comprising a plurality of programmable logic cells each comprising an associated input/output connection, a plurality of input connections, and a matrix operable to select input signals for each programmable logic cell selected from input signals provided by the input connections and the input/output connections, wherein the input connections are connected with associated external input pins and the input/output connections are connected with respective external input/output pins;
  a central processing unit (CPU) and operable to program said programmable logic device via special function registers;
  wherein the matrix is further configured to select a plurality of further signals from the input signals provided by the input connections and the input/output connections which are logically combined by an associated cell to generate at least one interrupt signal; and
  an interrupt control unit receiving said at least one interrupt signal and operable to generate an interrupt signal fed to said CPU.

* * * * *

UNITED STATES PATENT AND TRADEMARK OFFICE
CERTIFICATE OF CORRECTION

PATENT NO.         : 9,946,667 B2
APPLICATION NO.    : 12/560688
DATED              : April 17, 2018
INVENTOR(S)        : Gregg Lahti et al.

Page 1 of 1

It is certified that error appears in the above-identified patent and that said Letters Patent is hereby corrected as shown below:

In the Claims

Column 9,
Claim 18, Line 19, "...and an external clock signals..." ---Change to--- "...and an external dock signals..."

Column 10,
Claim 28, Line 18, "...the step of selecting a clock signal and feeding the selected..." ---Change to--- "...the step of selecting a dock signal and feeding the selected..."

Column 10,
Claim 29, Line 22, "...dock signals and feeding the selected clock signal to said..." ---Change to--- "...dock signals and feeding the selected dock signal to said..."

Signed and Sealed this
Second Day of October, 2018

Andrei Iancu
*Director of the United States Patent and Trademark Office*